(12) United States Patent
Karthik et al.

(10) Patent No.: US 12,001,392 B2
(45) Date of Patent: Jun. 4, 2024

(54) SNAPSHOT AND RESTORATION OF DISTRIBUTED FILE SYSTEM

(71) Applicant: Rubrik, Inc., Palo Alto, CA (US)

(72) Inventors: Vijay Karthik, Sunnyvale, CA (US); Anshul Gupta, Mountain View, CA (US); Abhay Mitra, Santa Clara, CA (US); Vivek Sanjay Jain, Palo Alto, CA (US); Satwant Rana, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 312 days.

(21) Appl. No.: 17/363,694

(22) Filed: Jun. 30, 2021

(65) Prior Publication Data
US 2022/0019555 A1 Jan. 20, 2022

Related U.S. Application Data

(60) Provisional application No. 63/053,146, filed on Jul. 17, 2020.

(51) Int. Cl.
| | |
|---|---|
| *G06F 16/11* | (2019.01) |
| *G06F 16/16* | (2019.01) |
| *G06F 16/174* | (2019.01) |
| *G06F 16/182* | (2019.01) |

(52) U.S. Cl.
CPC .......... *G06F 16/128* (2019.01); *G06F 16/164* (2019.01); *G06F 16/1752* (2019.01); *G06F 16/1844* (2019.01)

(58) Field of Classification Search
CPC ....... G06F 16/128; G06F 16/184–1844; G06F 16/164; G06F 16/1748–1752

USPC ........................................................ 707/639
See application file for complete search history.

(56) References Cited

U.S. PATENT DOCUMENTS

| | | | | |
|---|---|---|---|---|
| 8,370,302 | B2 * | 2/2013 | Otani .................. | G06F 11/1464 707/640 |
| 8,527,544 | B1 * | 9/2013 | Colgrove .............. | G06F 3/0641 707/791 |
| 9,189,342 | B1 * | 11/2015 | von Thenen ........ | G06F 9/45558 |
| 9,298,723 | B1 * | 3/2016 | Vincent ................ | G06F 16/183 |
| 10,275,321 | B1 * | 4/2019 | Bajaj ..................... | G06F 16/188 |
| 2006/0218364 | A1 * | 9/2006 | Kitamura .............. | G06F 3/0653 711/162 |

(Continued)

OTHER PUBLICATIONS

Song, Weijia, et al., "The Freeze-Frame File System", SoCC '16, Santa Clara, CA, Oct. 5-7, 2016, pp. 307-320.*

(Continued)

*Primary Examiner* — Robert Stevens
(74) *Attorney, Agent, or Firm* — Holland & Hart LLP

(57) ABSTRACT

In some examples, a data management system processes snapshots of a distributed file system, the distributed file system having files, each file comprising multiple data chunks. The data management system performs operations including storing file-to-chunk mapping in file system metadata; creating, for each chunk, a chunk generation ID by associating each chunk with a file system generation ID; in a next-generation snapshot of the distributed file system, incrementing, for all chunks in the next-generation snapshot, the respective chunk generation IDs; and taking a snapshot of the file system metadata and storing an updated file-to-chunk mapping associated with the next-generation snapshot.

12 Claims, 11 Drawing Sheets

(56) References Cited

U.S. PATENT DOCUMENTS

| | | | |
|---|---|---|---|
| 2010/0070466 A1* | 3/2010 | Prahlad | H04L 67/1095 |
| | | | 711/E12.001 |
| 2010/0070474 A1* | 3/2010 | Lad | G06F 3/067 |
| | | | 707/624 |
| 2014/0129524 A1* | 5/2014 | Ueoka | G06F 11/1469 |
| | | | 707/681 |
| 2015/0127618 A1* | 5/2015 | Alberti | G06F 16/128 |
| | | | 707/678 |
| 2016/0124665 A1* | 5/2016 | Jain | G06F 16/128 |
| | | | 711/162 |
| 2016/0274980 A1* | 9/2016 | Kim | G06F 11/1453 |
| 2017/0262345 A1* | 9/2017 | Wang | G06F 11/1469 |
| 2018/0046553 A1* | 2/2018 | Okamoto | G06F 11/1451 |
| 2018/0089224 A1* | 3/2018 | Muthuswamy | G06F 16/13 |
| 2019/0108099 A1* | 4/2019 | Mazumdar | G06F 21/6218 |
| 2019/0171374 A1* | 6/2019 | Jain | H04L 43/0817 |
| 2019/0213123 A1* | 7/2019 | Agarwal | G06F 3/0608 |
| 2022/0027313 A1* | 1/2022 | George | G06F 16/148 |

OTHER PUBLICATIONS

Cao, Zhichao, et al., "A Tier-Aware Data Deduplication-Based File System", ACM Transactions on Storage, vol. 15, No. 1, Article 4, Feb. 2019, 26 pages.*

* cited by examiner

SNAPSHOT AND RESTORATION OF DISTRIBUTED FILE SYSTEM

CLAIM OF PRIORITY

This patent application claims the benefit of priority, under 35 U.S.C. Section 119(e), to Karthik et al, U.S. Provisional Patent Application Ser. No. 63/053,146, entitled "SNAPSHOT AND RESTORATION OF DISTRIBUTED FILE SYSTEM," filed on Jul. 17, 2020, which is hereby incorporated by reference herein in its entirety.

TECHNICAL FIELD

The present disclosure relates generally to snapshotting a distributed file system and restoration of files in the distributed file system while maintaining a low data processing overhead during normal input/output (I/O) operations.

BACKGROUND

The volume and complexity of data that is collected, analyzed, and stored are increasing rapidly over time. The computer infrastructure used to handle this data is also becoming more complex, with more processing power and more portability. As a result, data management and storage are becoming increasingly important.

SUMMARY

In some examples, a data management system processes snapshots of a distributed file system, the distributed file system having files, each file comprising multiple data chunks. An example data management system comprises at least one processor configured to perform operations including: storing file-to-chunk mapping in file system metadata; creating, for each chunk, a chunk generation ID by associating each chunk with a file system generation ID; in a next-generation snapshot of the distributed file system, incrementing, for all chunks in the next-generation snapshot, the respective chunk generation IDs; and taking a snapshot of the file system metadata and storing an updated file-to-chunk mapping associated with the next-generation snapshot.

In some examples, the operations further comprise garbage-collecting chunks for expired file system snapshots based on a chunk generation ID.

In some examples, the operations further comprise rolling back the distributed file system to a previous snapshot based on a chunk generation ID and the filesystem metadata associated with the previous snapshot.

In some examples, the operations further comprise garbage-collecting unreachable chunks after the rollback of the file system to the previous snapshot.

BRIEF DESCRIPTION OF THE DRAWINGS

Some embodiments are illustrated by way of example and not limitation in the views of the accompanying drawing.

DETAILED DESCRIPTION

Figure 1A:
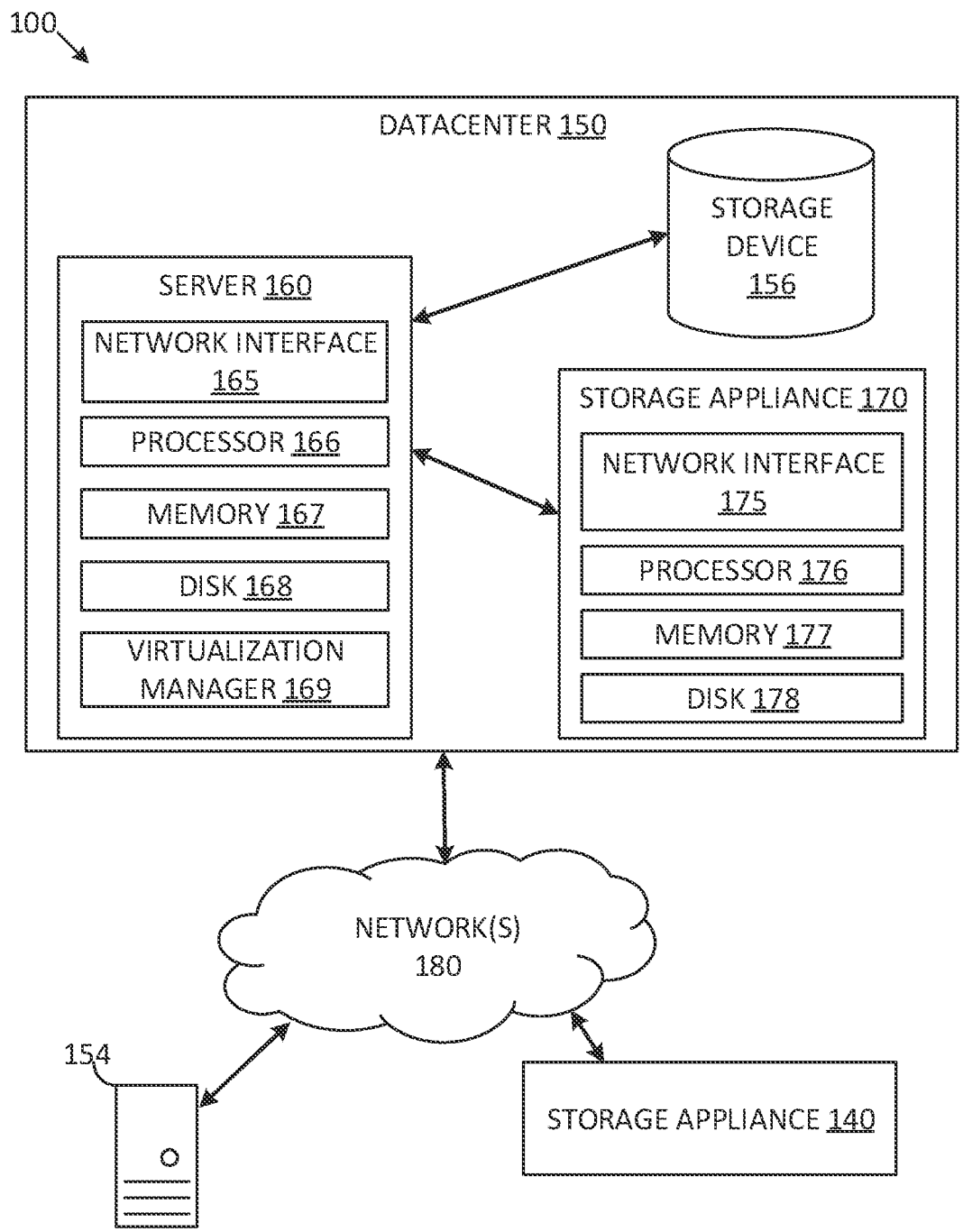
FIG. 1A is a block diagram illustrating an example networked computing environment in which some embodiments described herein are practiced.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

It will be appreciated that some of the examples disclosed herein are described in the context of virtual machines that are backed up by using base and incremental snapshots, for example. This should not necessarily be regarded as limiting of the disclosures. The disclosures, systems, and methods described herein apply not only to virtual machines of all types that run a file system (for example), but also to networked-attached storage (NAS) devices, physical machines (for example Linux servers), and databases.

Snapshotting is useful for data protection in case of a data failure after a system upgrade. Various embodiments described herein relate to global snapshotting of a distributed file system and restoring files in the distributed file system with minimum data processing overhead during normal I/O operations.

Challenging issues that can arise in processes including significant data processing overhead during normal I/O operations when a distributed file system is instructed to roll back to a previous state or version. In conventional distributed file systems, in the event of a system failure or a user-triggered event requesting the system to roll back to a previous state or version, the restoration of the file system may significantly increase data processing overhead during normal I/O operations, mainly because snapshots may be taken at a file-level instead of at a system-level.

In some present examples, because of using chunk generation and global snapshotting of the distributed file system, the system rollback and restoration to a previous state may occur immediately by restoring the mapping of metadata associated with each affected file to the previous state. Since restoring snapshots of distributed file system requires fewer data processing resources compared to restoring snapshots of each file, the goal of restoring files in the distributed file system with a minimum or reduced data processing overhead during normal I/O operations is sought to be achieved.

In some embodiments, metadata of the distributed file system is stored in a consistent, snapshottable distributed database. In some examples, the term "snapshottable" in relation to a distributed database means the distributed database is capable of being captured or backed up in one or more snapshots. In some examples, the term "snappable" in relation to an object, such as a file, means the object (e.g., the file) is capable of being captured or backed up in one or more snapshots. Each snapshot of a distributed file system is stored in one or more files in the distributed file system. In some embodiments, part of the snapshot is saved implicitly in the data layout on the hard disks or solid-state drives (SSDs) (e.g., chunk generation, filenames), and part of it is saved in the distributed database. A mapping of metadata of each file is stored in the distributed system, and the actual physical data pointed by the mapping is stored on a disk in a storage device, such as a SSD. Each file is partitioned into one or more chunks. Each chunk corresponds to metadata that may include a chunk path pointing to the location of data stored in a data storage device. Each chunk is replicated across all nodes in a cluster, such as via replication or application of erasure coding. In some embodiments, each chunk is not replicated across all nodes. Depending on the configuration of the system, a chunk may be replicated, for example, on three nodes. In the case of node failure, the system is still able to recover data based on surviving nodes that contain the replicated data. The chunks may include mutable chunks and immutable chunks. The content of the mutable chunks can be modified (e.g., overwritten) by the distributed file system, whereas the content of immutable chunks may not be modified. Immutable chunks may only be copied or deleted. Therefore, writes are only allowed to mutable chunks. In some embodiments, mutable chunks make up a small number of chunks stored in the distributed file system. Writes refer to adding or modifying data to existing chunks or creating new chunks.

In some embodiments, when the system or user deletes an immutable chunk, the distributed file system only removes the metadata associated with the chunk from the mapping, instead of deleting the physical data of the chunk from the disk. Once the immutable chunk needs to be restored (e.g., rolled back) to a previous state, the system restores the metadata pointing back to the deleted immutable chunk to the current mapping, so that the deleted immutable chunks are restored back to the file. In case the deleted immutable chunk never needs to be restored before the associated snapshot is set to expire, the physical data of the immutable chunk is removed from the disk.

In some embodiments, new mutable chunks are created and added to the mapping of the current file. A mutable chunk of the current (or first) generation can be overwritten with new data. In order to update a mutable chunk of a previous (or second) generation, the system may copy the content of the chunk to a new location with the current generation ID and overwrite the content of the new chunk accordingly. Specifically, overwriting a mutable chunk includes copying the physical data of the mutable chunk from a previous disk location to a new disk location and updating the metadata pointing to the new location. All new writes to the mutable chunk will occur in the new location. When the distributed file system needs to roll back to a previous state, the metadata of the mutable chunk pointing to the previous location is restored back to the mapping of the current file, so that the deleted mutable chunks are restored back to the file. The physical data of a mutable chunk in the old location is removed only after the associated snapshot is set to expire. The physical data of a mutable chunk in the new location is removed after a file system roll back (e.g., restoration)

In some embodiments, the chunk path on disk and in metadata of files may include a file name, a node identifier, a chunk ID, a Universal Unique Identifier (UUID), and a current chunk generation ID. For newly created chunks, the encoded chunk generation in the chunk path is associated with the current generation of the file. The current generation of a new chunk is consistent with the current generation of the distributed file system.

In some embodiments, during the operation of snapshot capture for the distributed file system, the current chunk generation ID is incremented by 1 at the same time the snapshot is taken. Therefore, incrementing the chunk generation ID and the snapshot can share the same timestamp. To ensure consistency of incrementing chunk generation on all nodes of the cluster, writes can be quiesced until all nodes increment their chunk generation. Incrementing chunk generation on all nodes is achieved using a distributed consensus protocol, such as a two-phase commit protocol.

In some embodiments, content updates of previously created mutable chunks without an association with a chunk generation ID requires special handling compared to updating the newly created chunks. The generation ID of the chunks may be extracted from the chunk path if the ID has been encoded. During a write operation, if the value of chunk generation ID is equal to the value of the current generation ID of the file or snapshot, the same chunk is updated. If the value of chunk generation ID is lower than the value of current generation ID of the file or snapshot, then the content of the particular chunk is copied over to a new path under which the chunk generation ID is revised to the current generation ID. The new chunk path can correspond to a new disk location. Writes happen to the copied chunk while the original chunk is left as is. The metadata mapping of the current file to which the copied chunk belongs is updated to include the chunk. Copying a chunk to a new chunk path consumes some data processing bandwidth. However, each mutable chunk corresponding to an old generation may only need to be copied once to be written with new data. Once the new path with the current generation ID is associated with the copied chunk, future writes may simply update this chunk under the current generation. Given that the percentage of mutable chunks in a cluster is relatively small, this is likely to pose a small burden to the data processing overhead.

In some embodiments, the distributed file system periodically deletes redundant and inactive chunks to free up space. The deletion of chunks is disabled for all chunk generations belonging to active snapshots. Deletion is not disabled for chunks of the current generation if they are no longer included in the metadata mappings of the files. Once a snapshot and all previous snapshots associated with it are set to expire, the distributed file system may delete chunks corresponding to the deleted files of those old generations. Conditions to expire snapshots may include user trigger events, such as deletion of certain files based on user command, or system trigger events, such as system periodic clean-ups (e.g., garbage collection operations).

In some embodiments, if the value of the chunk generation ID of a chunk is higher than the value of the current generation of the distributed file system to which it belongs, the chunk may be deleted. If the value of the chunk generation ID of a chunk is equal to the value of the current generation of the distributed file system to which it belongs, the chunk may be deleted if it is not in the metadata mapping of any file. For chunks with a value of the chunk generation ID lower than the value of the current generation of the distributed file system, the chunks will be deleted only if the corresponding snapshot is set to expire.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1A is a block diagram illustrating one embodiment of a networked computing environment 100 in which some embodiments are practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a SSD, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure. The one or more virtual machines may run various applications, such as a cloud-based service, a database application, or a web server. The storage device 156 may include one or more hardware storage devices for storing data, such as a hard disk drive (HDD), a magnetic tape drive, a SSD, a storage area network (SAN) storage device, or a NAS device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167. Processor 166 may include one or more processing units or processing devices, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk file associated with the state of the virtual disk at the point in time is frozen. The virtual disk file may be set into a read-only state to prevent modifications to the virtual disk file while the virtual machine is in the frozen state. The virtualization manager 169 may then transfer data associated with the virtual machine (e.g., an image of the virtual machine or a portion of the image of the virtual machine) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of 1000 virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business-related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface (GUI)) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5/Version23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

In some embodiments, the management system 190 provides management of one or more clusters of nodes as described herein, such as management of one or more policies with respect to the one or more clusters of nodes. The management system 190 can serve as a cluster manager for one or more clusters of nodes (e.g., present in the networked computing environment 100). According to various embodiments, the management system 190 provides for central management of policies (e.g., SLAs) that remotely manages and synchronizes policy definitions with clusters of nodes. For some embodiments, the management system 190 facilitates automatic setup of secure communication channels between clusters of nodes to facilitate replication of data. Additionally, for some embodiments, the management system 190 manages archival settings for one or more clusters of nodes with respect to cloud-based data storage resource provided by one or more cloud service provider.

Figure 1B:
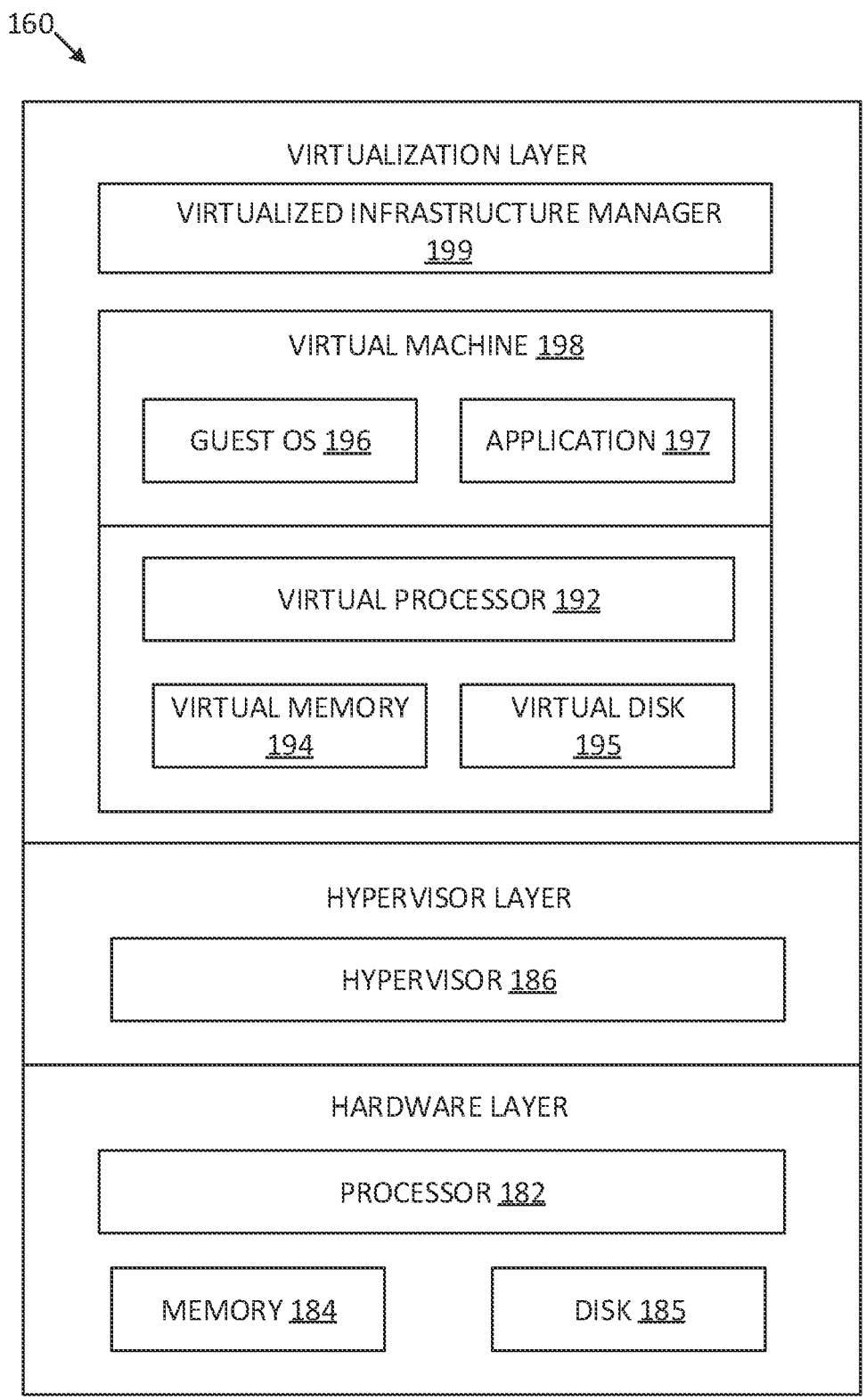
FIG. 1B is a block diagram illustrating one embodiment of a server in the example networked computing environment of FIG. 1A.

FIG. 1B is a block diagram illustrating one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 5:30 p.m. on Jun. 29, 2024) and a second snapshot of the virtual machine may correspond with a second state of the virtual machine at a second point in time subsequent to the first point in time (e.g., 5:30 p.m. on Jun. 30, 2024).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 may or the hypervisor 186 may communicate with a storage appliance, such as storage appliance 140 in FIG. 1A or storage appliance 170 in FIG. 1A, using a distributed file system protocol such as NFS. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 1C:
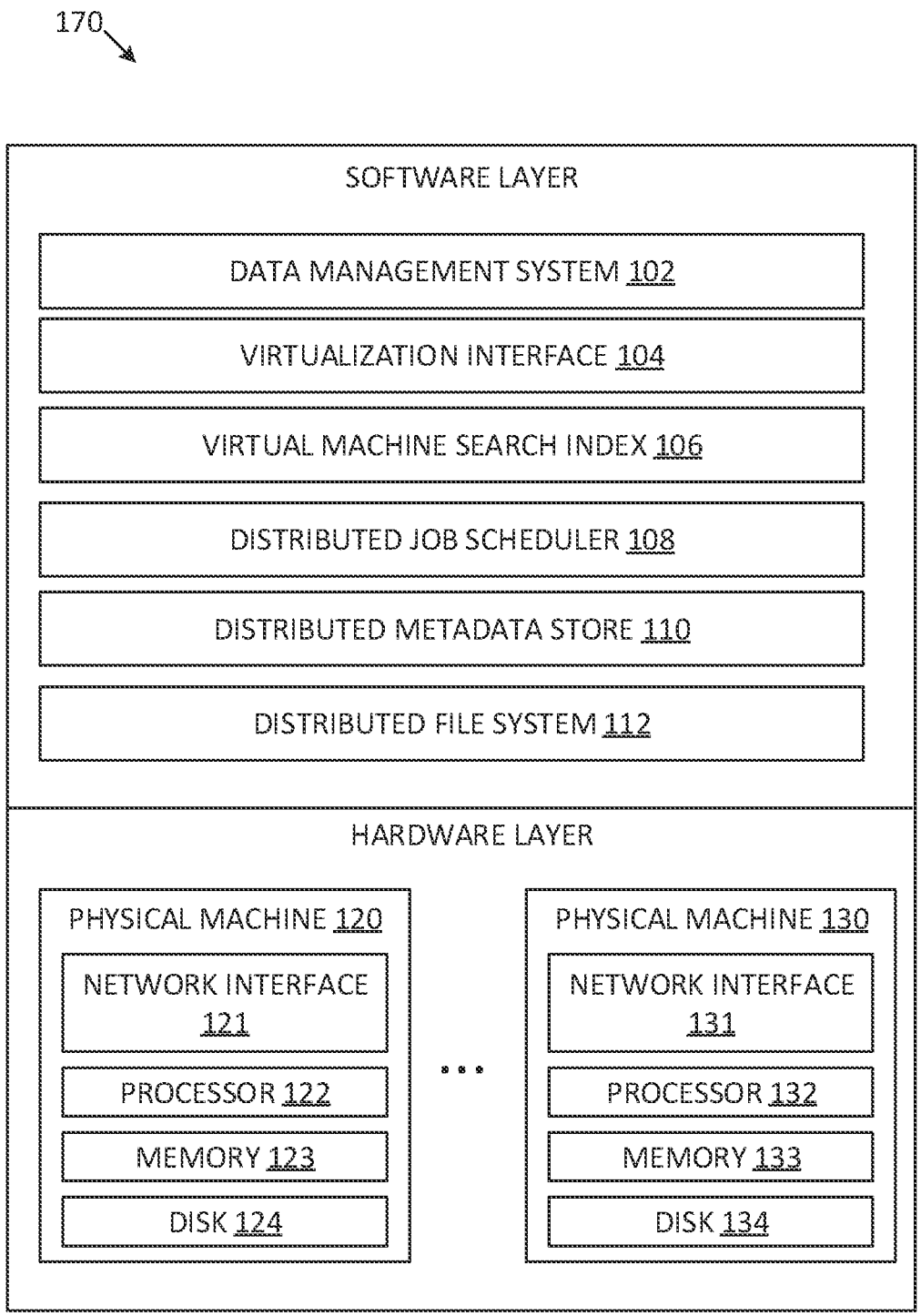
FIG. 1C is a block diagram illustrating one embodiment of a storage appliance in the example networked computing environment of FIG. 1A.

FIG. 1C is a block diagram illustrating one embodiment of storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a HDD and/or a SSD. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client-side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node(j) may be (j−i) modulo N. In another example, given a number (N) of nodes in a cluster from node(0) to node(N−1), for a floating IP address (i), the VRRP priority of node(j) may be (i−j) modulo N. In these cases, node(j) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file.

In some embodiments, the data management system 102 resides inside the distributed file system 112. The data management system 102 may receive requests to capture snapshots of the entire distributed file system 112, on a periodic basis based on internal protocols, or upon occurrence of user triggered events.

The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within 3 minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster. In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 1B, to create a frozen copy of the virtual machine and to transfer one or more chunks (or one or more files) associated with the frozen copy to a storage appliance, such as storage appliance 170 in FIG. 1A. The one or more tasks may also include generating metadata for the one or more chunks, storing the metadata using the distributed metadata store 110, storing the one or more chunks within the distributed file system 112, and communicating with the virtualized infrastructure manager that the virtual machine the frozen copy of the virtual machine may be unfrozen or released for a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2024), and a file path to where the first chunk is stored within the distributed file system 112 (e.g., the first chunk is located at /snapshots/VM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that include the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1C.

The data management system 102 may comprise an application running on the storage appliance that manages and stores one or more snapshots of a virtual machine. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Figure 2:
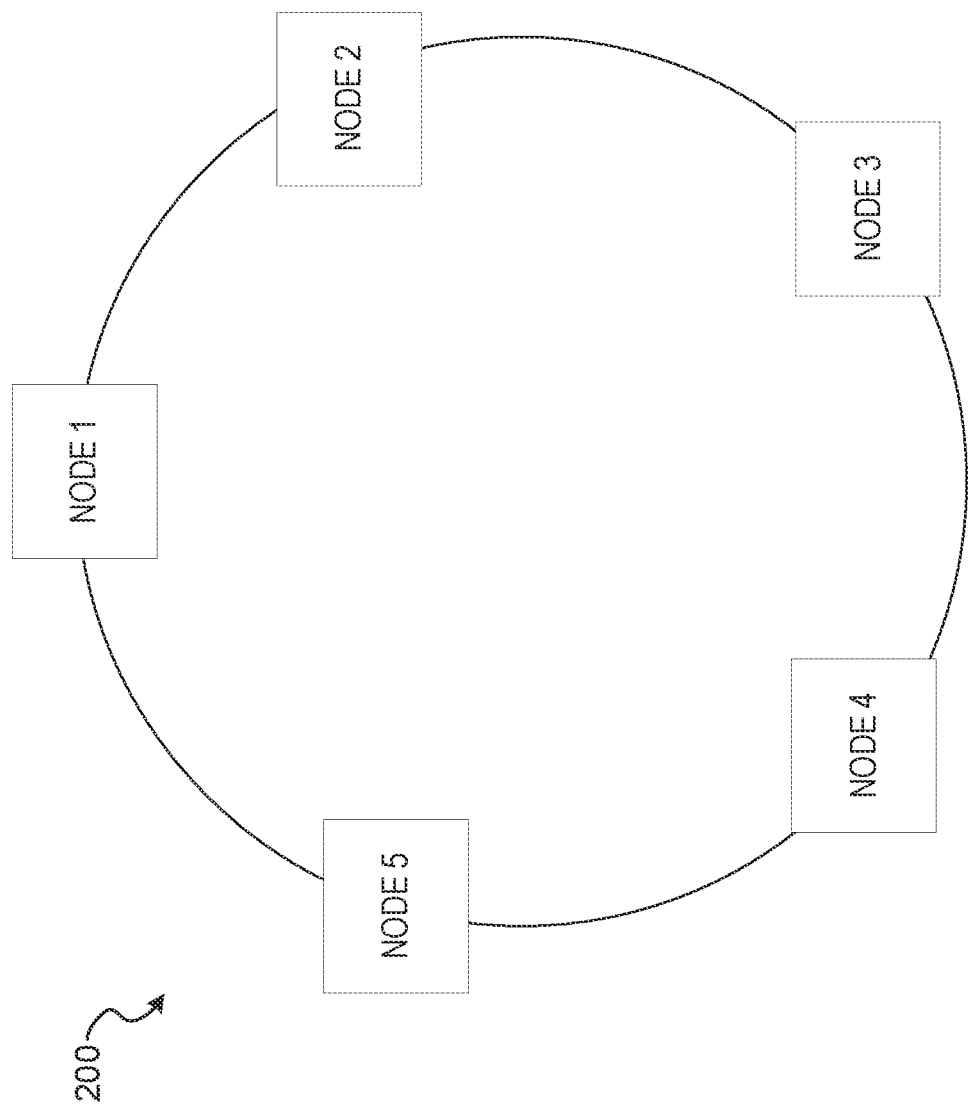
FIG. 2 is a block diagram illustrating an example cluster of a distributed decentralized database, according to some example embodiments.

FIG. 2 is a block diagram illustrating an example cluster 200 of a distributed decentralized database, according to some example embodiments. As illustrated, the example cluster 200 includes five nodes, nodes 1-5. In some example embodiments, each of the five nodes runs from different machines, such as physical machine 130 in FIG. 1C or virtual machine 198 in FIG. 1B. The nodes in the example cluster 200 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in that data is sharded or distributed across the example cluster 200 in shards or chunks and decentralized in that there is no central storage device and no single point of failure. The system operates under an assumption that multiple nodes may go down, up, become non-responsive, and so on. Sharding is splitting up of the data horizontally and managing each shard separately on different nodes. For example, if the data managed by the example cluster 200 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the example cluster 200. For example, data written to node 1 can be replicated to nodes 2 and 3. If node 1 prematurely terminates, node 2 and/or 3 can be used to provide the replicated data. In some example embodiments, each node of example cluster 200 frequently exchanges state information about itself and other nodes across the example cluster 200 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the example cluster 200.

Reading: Any node of example cluster 200 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of example cluster 200 are configured to function the same way (e.g., as symmetrical peer database nodes that communicate via gossip protocol, such as Cassandra nodes) with no single point of failure. If one of the nodes in example cluster 200 terminates prematurely ("goes down"), another node can rapidly take the place of the terminated node without disrupting service. The example cluster 200 can be a container for a keyspace, which is a container for data in the distributed decentralized database system (e.g., whereas a database is a container for containers in conventional relational databases, the Cassandra keyspace is a container for a Cassandra database system).

Figure 3:
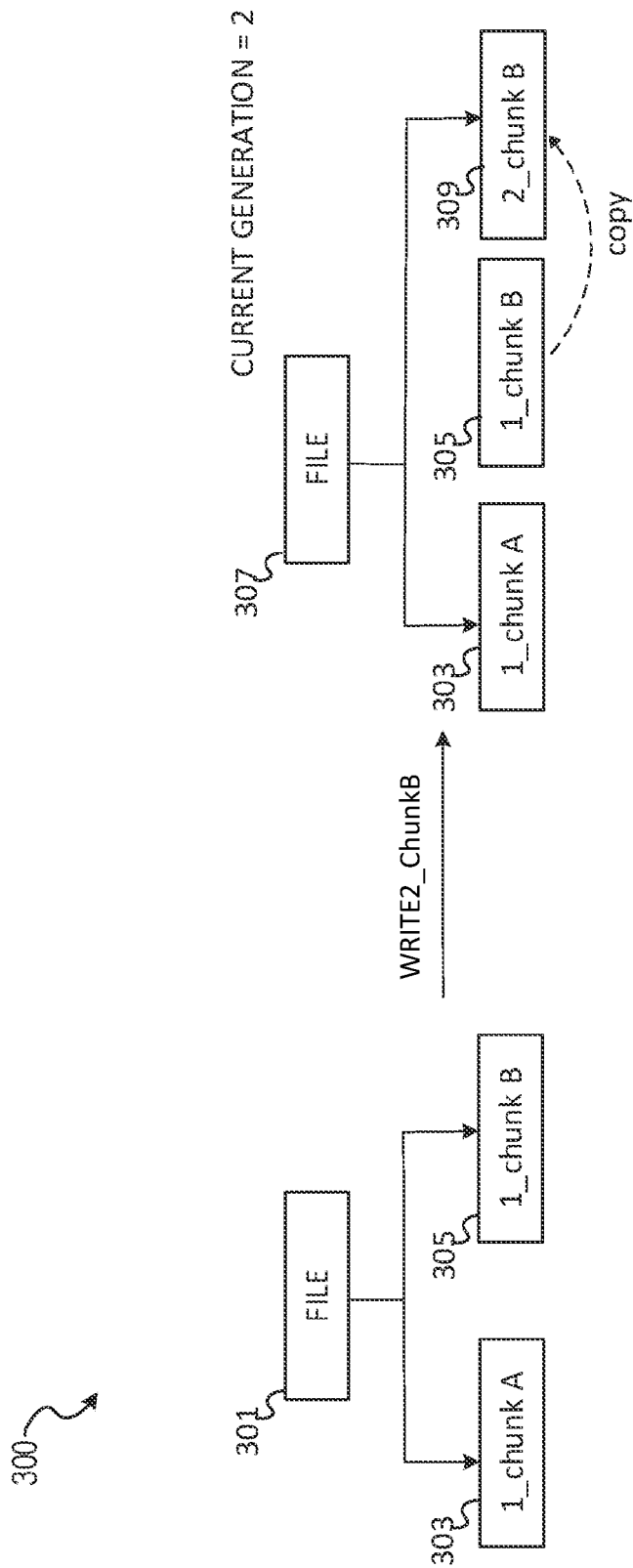
FIG. 3 is a block diagram illustrating a metadata mapping update to existing chunks in response to data writes, in accordance with some embodiments described herein.

FIG. 3 is a block diagram illustrating a metadata mapping update to existing chunks in response to data writes, in accordance with some embodiments described herein. A metadata mapping of file 301 includes metadata of file 301 pointing to chunk 303 and chunk 305. An updated metadata mapping of file 307 includes metadata of file 307 pointing to chunk 303 and chunk 309.

File 301 includes chunk A 303 and chunk B 305. Both chunks 303 and 305 are mutable chunks with the value of chunk generation ID set to 1. Both chunks 303 and 305 are included in a first snapshot corresponding to the first generation of the distributed file system. In FIG. 3, the current generation is 2, referring to the current state of the distributed file system is after the second snapshot is taken. When the chunk 305 needs to be updated before the next snapshot is taken, the file system may copy physical data of chunk 305 to a new location of the storage device corresponding to a copied chunk 309, and associate the physical data of chunk 309 with a chunk path including the current generation (i.e., 2) of the distributed file system. All new writes to chunk 309 will occur at the new disk location. Chunk 305 is thereby removed from the metadata mapping of file 307. However, the physical data of chunk 305 may not be removed by garbage collection operations as long as the first snapshot to which chunk 305 belongs has not been set to expire. In some embodiments, the value of the generation ID of the snapshot is equal to the values of the generation ID of the distributed file system and each new chunk created.

Figure 4:
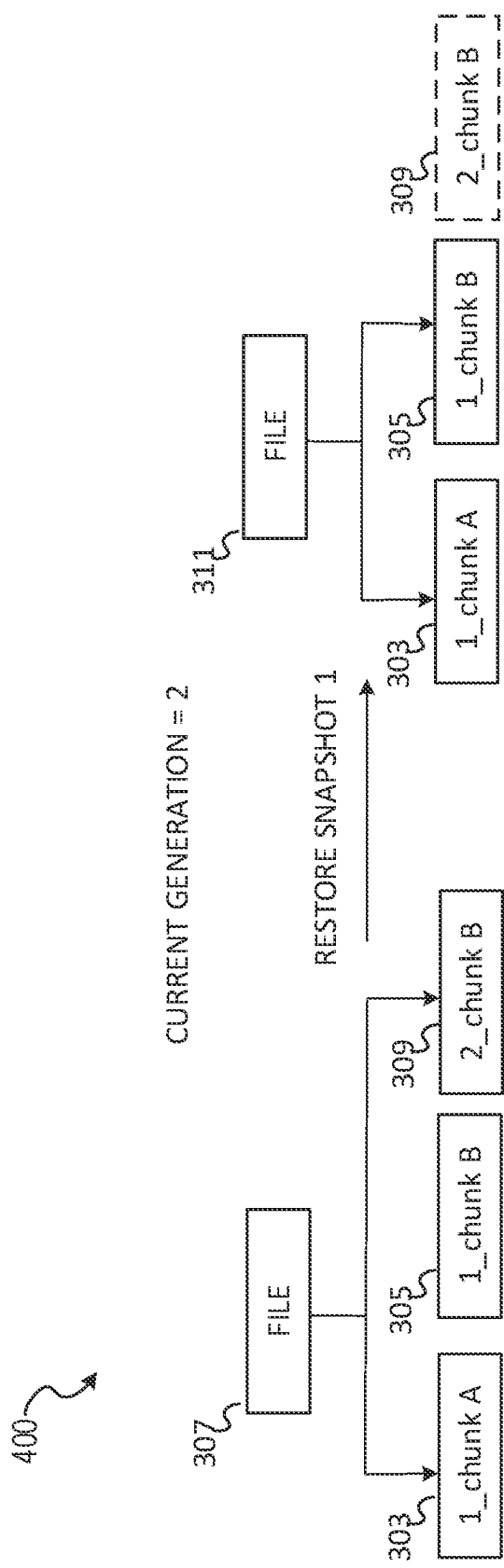
FIG. 4 is a block diagram illustrating a process of restoring a snapshot of the distributed file system, in accordance with some embodiments described herein.

FIG. 4 is a block diagram 400 illustrating a process of restoring a snapshot of the distributed file system, in accordance with some embodiments described herein. When the distributed file system needs to be restored to the state when the first snapshot was taken, the metadata of chunk 305 is restored back to the metadata mapping of then file 307, now file 311. After restoration, the file 311 includes chunk 303 and chunk 305 both including the chunk generation ID 1 referring to the first snapshot. All new writes to chunk 309 at the new disk location are automatically disassociated from file 311 as the metadata mapping no longer includes chunk 309. The restoration of metadata mapping of files consumes minimum processing resources, thereby it does not create additional overhead during normal I/O operations.

Figure 5A:
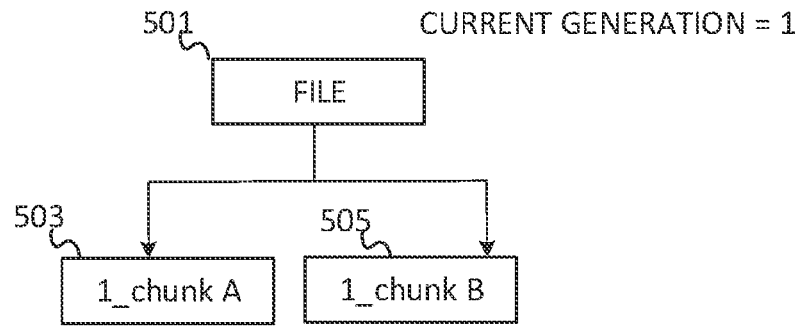
FIGS. 5A-5C are block diagrams illustrating a process of generating snapshots of a distributed file system, in accordance with some embodiments.
Figure 5B:
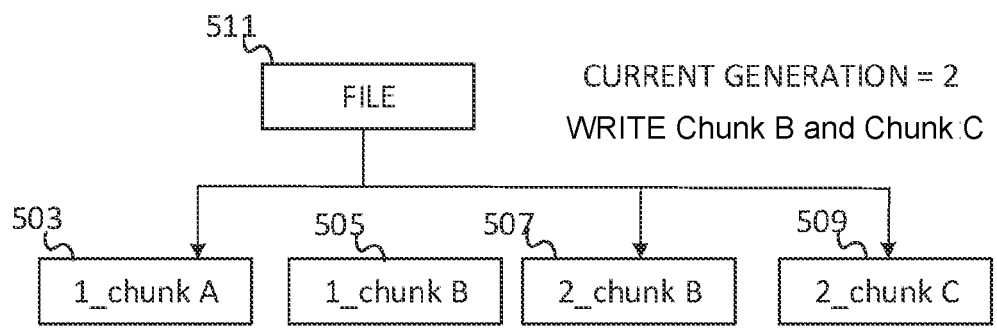
Figure 5C:
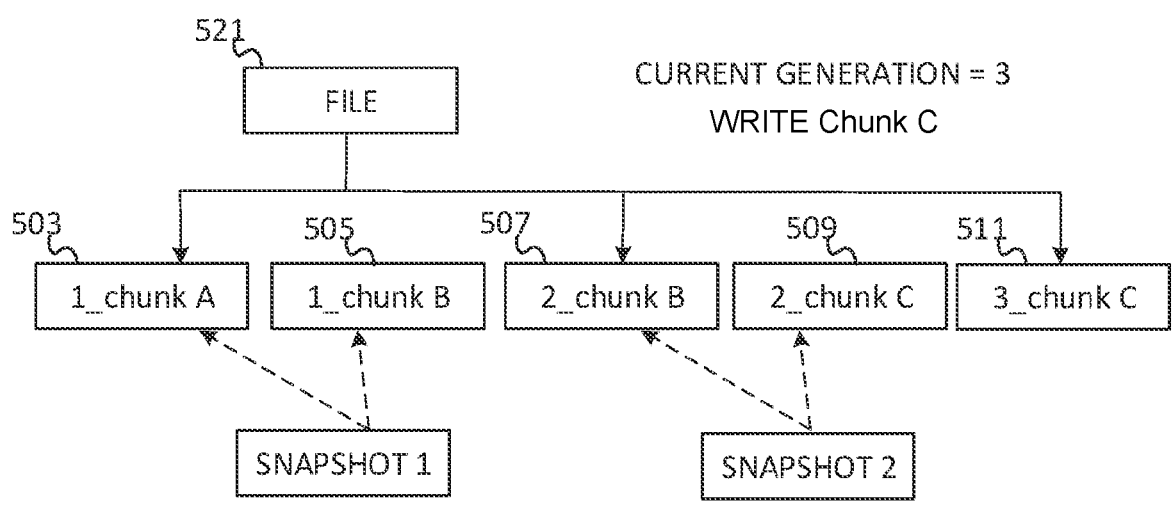

FIGS. 5A-5C are block diagrams illustrating a process of generating snapshots of a distributed file system, in accordance with some embodiments. In FIG. 5A, the current generation of the distributed file system is 1. The file 501 includes two chunks, 503 and 505, both belonging to the first snapshot, as the respective chunk generation ID is 1 as shown. The metadata mapping of file 501 includes both chunks 503 and 505. In FIG. 5B after the second snapshot is taken for the file system, two new chunks 507 and 509 belonging to the second snapshot are included in file 511. If chunk B is a mutable chunk, chunk 507 is created based on the discussion under FIG. 4. The metadata of the old chunk 505 is disassociated from the mapping of file 511. The new chunk 507 will be updated with new writes to chunk B. Chunk 509 includes chunk C, which is a new chunk not previously included in file 501. Therefore, chunk 509 is simply added to the metadata mapping of file 511. Chunk 509 includes a chunk generation ID of 2, referring to the current generation of the distributed file system.

In FIG. 5C, after the third snapshot is taken for the distributed file system, a new write to chunk C has occurred. If chunk C is a mutable chunk, chunk 511 is created from chunk 509 based on the discussion under FIG. 4. The new chunk 511 is associated with the current generation (i.e., 3) of the distributed file system. The metadata of the old chunk 509 is disassociated from the mapping of file 511, as the new chunk 511 carries the same content (i.e., chunk C) and is to be updated with new writes.

Figure 6A:
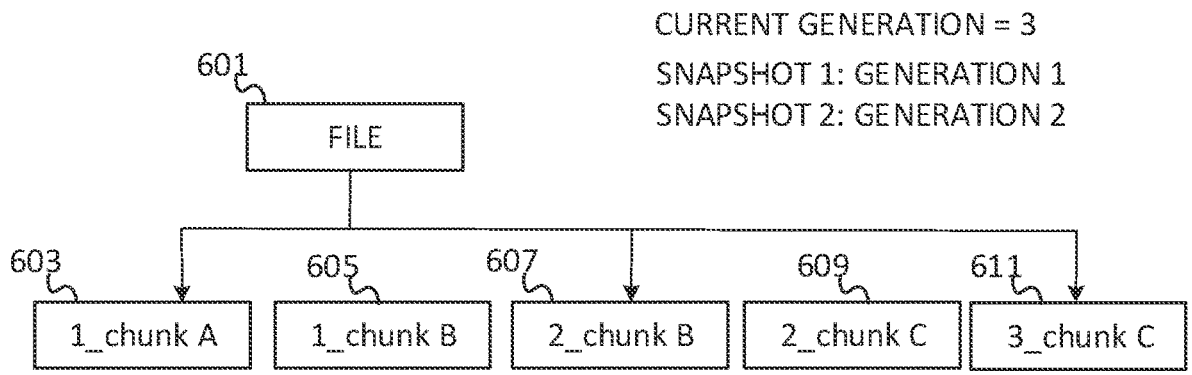
FIGS. 6A-6C are block diagrams illustrating a change to mappings of chunks as previous snapshots set to expire, in accordance with some embodiments.
Figure 6B:
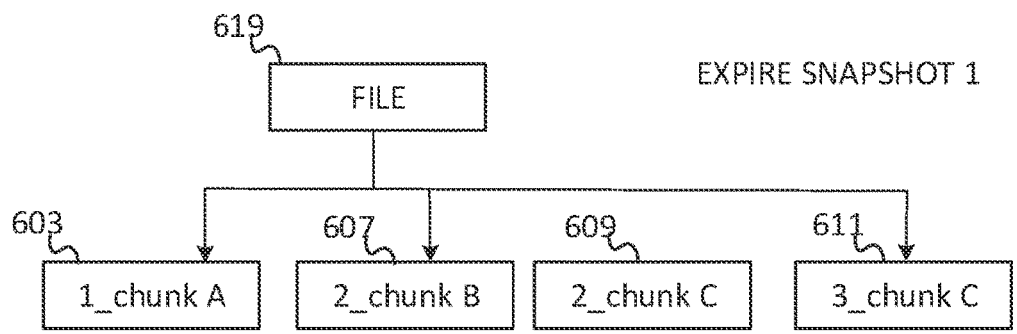
Figure 6C:
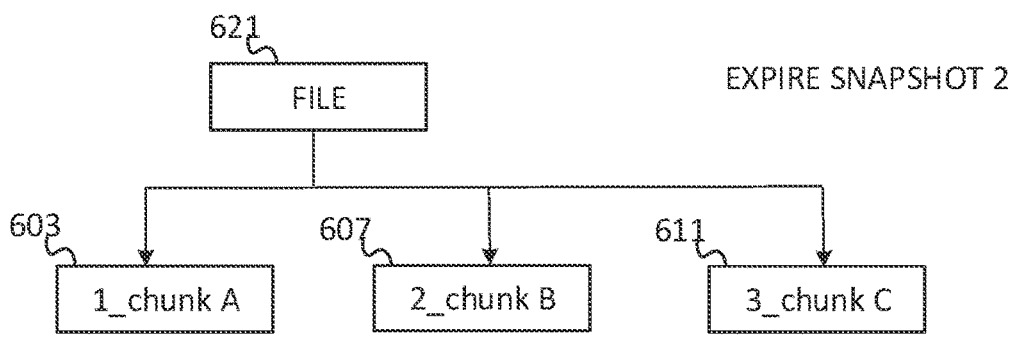

FIGS. 6A-6C are block diagrams illustrating a change to mappings of chunks as previous snapshots are set to expire, in accordance with some embodiments. In FIG. 6A, the current generation of the distributed file system is 3. The first snapshot corresponds to the first generation of the file system, and the second snapshot corresponds to the second generation of the file system. Each chunk associated with the number of generation ID is created when the respective snapshot is taken under the respective generation of the file system. For example, chunk 603 is included in the first snapshot as the chunk generation ID indicates "1_", and chunk 611 is included in the third snapshot as the chunk generation ID indicates "3_".

In FIG. 6B, the first snapshot is set to expire. Conditions to expire snapshots may include user trigger events, such as deletion of a snapshot of the distributed file system based on user input, or system trigger events, such as periodic cleanups (e.g., garbage collection operations) to remove inactive or redundant data, including chunks associated with snapshots that are set to expire. For chunks with chunk generation ID indicating an older generation of the distributed file system and the corresponding snapshot, garbage collection operations may only remove chunks that are not currently included in the metadata mapping of any files from the disks. Therefore, as shown in FIG. 6B, chunk 605 belonging to the first snapshot but no longer included in the metadata mapping of file 601, the physical data of chunk 605 is removed from the disks by the garbage collection operations. However, chunk 603 remains with file 619 as it is included in the mapping of file 619 despite belonging to the expired first snapshot.

In FIG. 6C, the second snapshot is set to expire based on the conditions to expire as discussed above. Since chunk 609 was not included in the metadata mapping of file 619 in FIG. 6B and it belongs to the expired second snapshot, the physical data of chunk 609 is removed from the disks by the garbage collection operations. Chunk 607 remains with file 621 as it is currently included in the mapping of file 621 despite belonging to the expired second snapshot.

Figure 9:
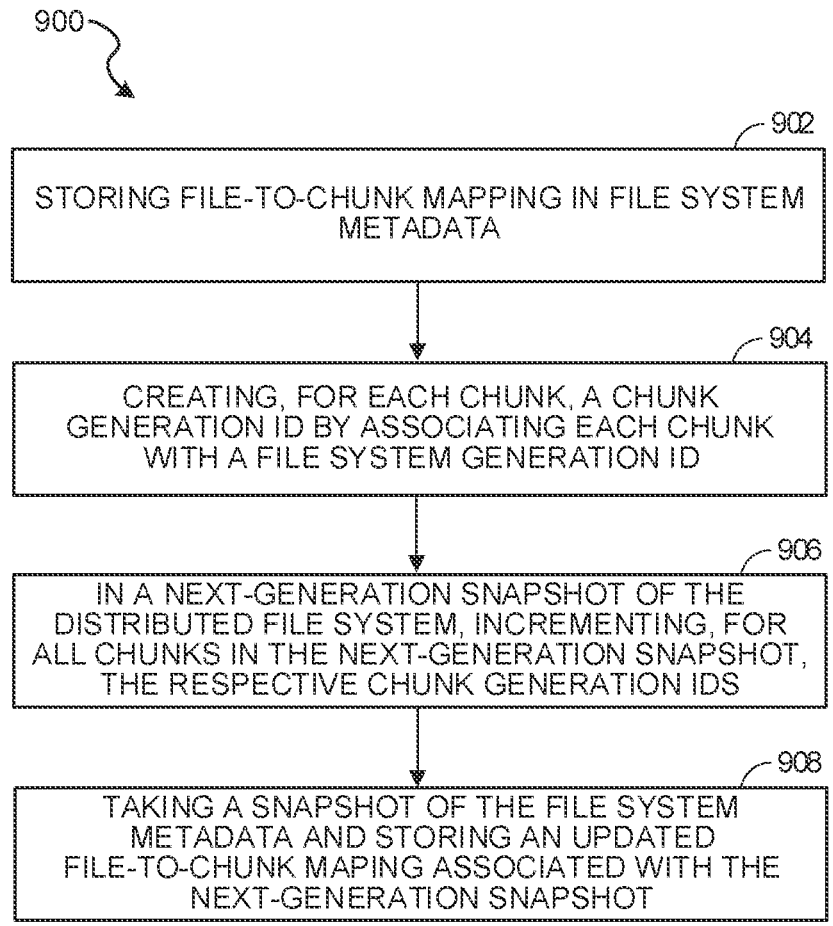
FIG. 9 is a flow chart depicting operations in a method, according to an example.

FIG. 9 is a flow chart depicting operations in an example method 900 of method of processing snapshots in a distributed file system, the distributed file system having files, each file comprising multiple data chunks, the method including: in operation 902, storing file-to-chunk mapping in file system metadata; in operation 904, creating, for each chunk, a chunk generation ID by associating each chunk with a file system generation ID; in operation 906, in a next-generation snapshot of the distributed file system, incrementing, for all chunks in the next-generation snapshot, the respective chunk generation LDs; and, in operation 908, taking a snapshot of the file system metadata and storing an updated file-to-chunk mapping associated with the next-generation snapshot.

In some examples, the method 900 further comprises garbage-collecting chunks for expired file system snapshots based on a chunk generation ID.

In some examples, the method 900 further comprises rolling back the distributed file system to a previous snapshot based on a chunk generation ID and the filesystem metadata associated with the previous snapshot.

In some examples, the method 900 further comprises garbage-collecting unreachable chunks after the rollback of the file system to the previous snapshot.

In some examples, a tangible or non-transitory machine-readable medium includes instructions which, when read by a machine, cause the machine to perform one or more operations as summarized above or as described elsewhere herein.

Figure 7:
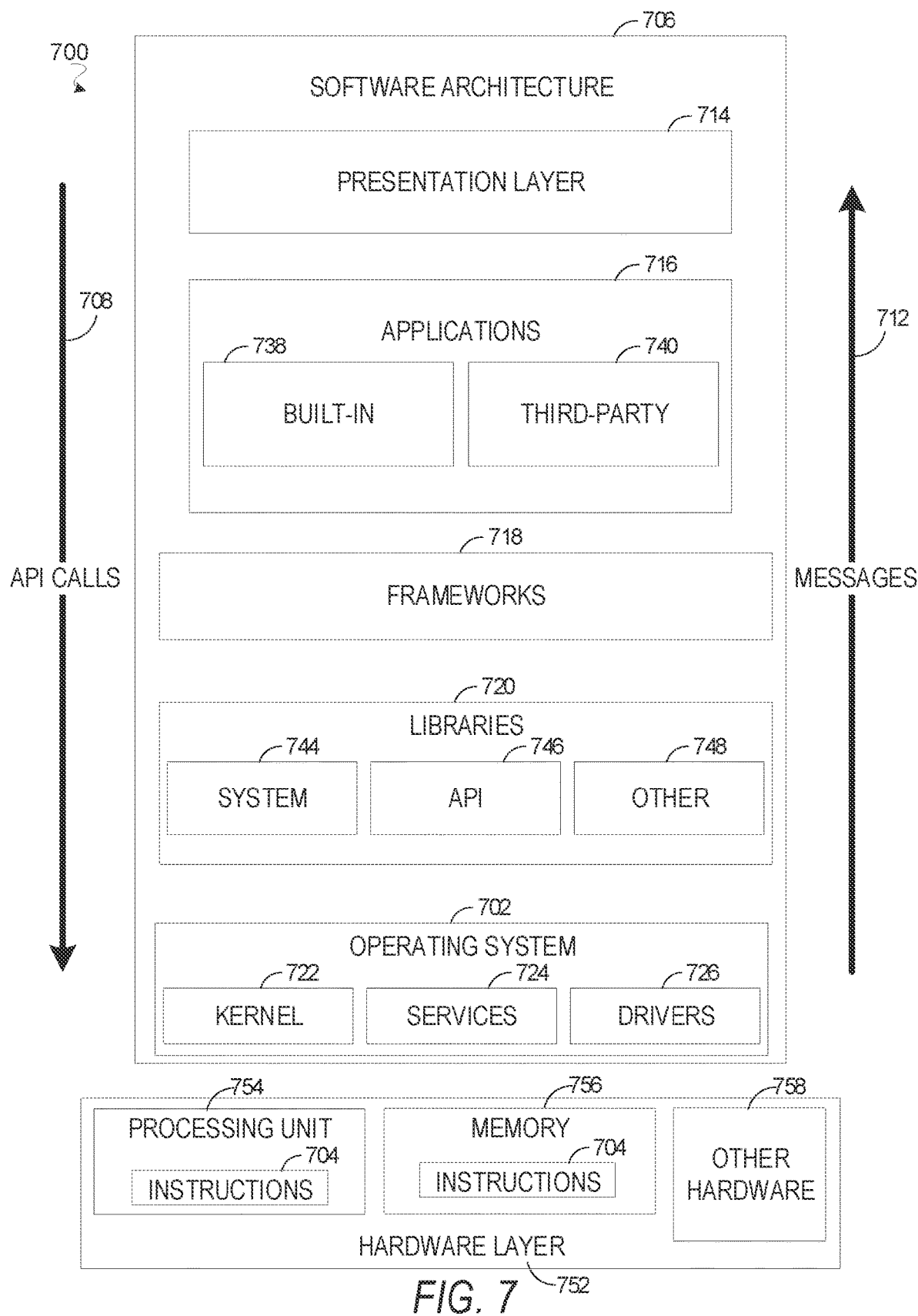
FIG. 7 is a block diagram illustrating an example architecture of software, that can be used to implement various embodiments described herein.

FIG. 7 is a block diagram 700 illustrating an example architecture 706 of software that can be used to implement various embodiments described herein. FIG. 7 is merely a non-limiting example of a software architecture, and it will be appreciated that many other architectures can be implemented to facilitate the functionality described herein. In various embodiments, the software is implemented by a hardware layer 752, which includes a processor 754 operating on instructions 704, a memory 756 storing instructions 704, and other hardware 758. For some embodiments, the hardware layer 752 is implemented using a machine 800 of FIG. 8 that includes processors 810, memory 830, and I/O components 850. In this example architecture 706, the software can be conceptualized as a stack of layers where each layer may provide a particular functionality. For example, the software 702 includes layers such as an operating system 702, libraries 720, frameworks 718, and applications 716. Operationally, the applications 716 invoke API calls 708 through the software stack and receive messages 712 in response to the API calls 708, consistent with some embodiments.

In various implementations, the operating system 702 manages hardware resources and provides common services. The operating system 702 includes, for example, a kernel 722, services 724, and drivers 726. The kernel 722 acts as an abstraction layer between the hardware and the other software layers, consistent with some embodiments. For example, the kernel 722 provides memory management, processor management (e.g., scheduling), component management, networking, and security settings, among other functionality. The services 722 can provide other common services for the other software layers. The drivers 726 are responsible for controlling or interfacing with the underlying hardware, according to some embodiments. For instance, the drivers 726 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 720 provide a low-level common infrastructure utilized by the applications 716. The libraries 720 can include system libraries 744 (e.g., C standard library) that can provide functions such as memory allocation functions, string manipulation functions, mathematic functions, and the like. In addition, the libraries 720 can include API libraries 746 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 720 can also include a wide variety of other libraries 748 to provide many other APIs to the applications 716.

The frameworks 718 provide a high-level common infrastructure that can be utilized by the applications 716, according to some embodiments. For example, the frameworks 718 provide various GUI functions, high-level resource management, high-level location services, and so forth. The frameworks 718 can provide a broad spectrum of other APIs that can be utilized by the applications 716, some of which may be specific to a particular operating system or platform.

In some embodiments, the applications 716 include a built-in application 738 and a broad assortment of other applications such as a third-party application 740. According to some embodiments, the applications 716 are programs that execute functions defined in the programs. Various programming languages can be employed to create one or more of the applications 716, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 708 provided by the operating system 702 to facilitate functionality described herein.

Figure 8:
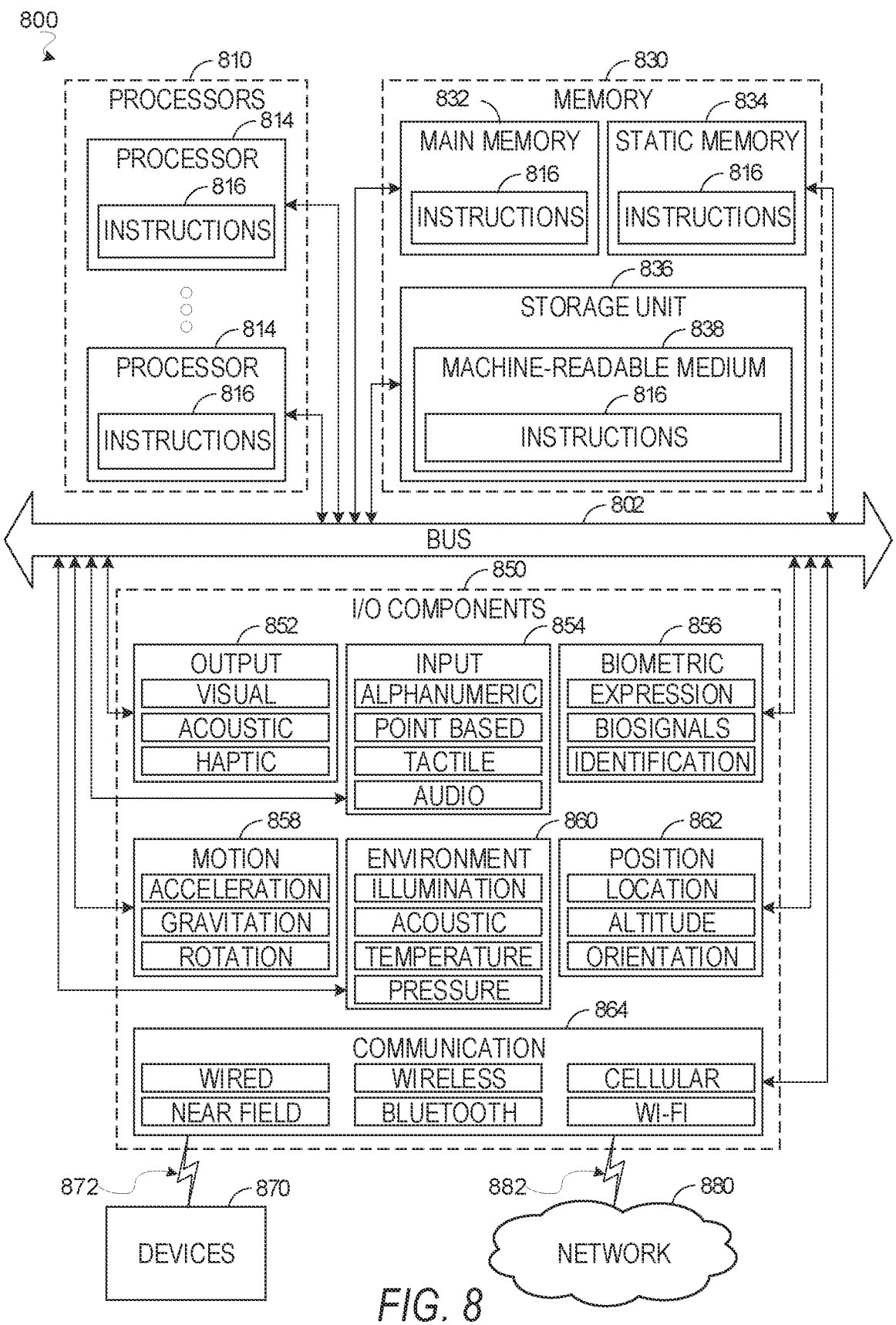
FIG. 8 illustrates a diagrammatic representation of an example machine in the form of a computer system within which a set of instructions may be executed for causing the machine to perform any one or more of the methodologies of various embodiments described herein.

FIG. 8 illustrates a diagrammatic representation of an example machine 800 in the form of a computer system within which a set of instructions may be executed for causing the machine to perform any one or more of the methodologies of various embodiments described herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 900 of FIG. 9. Additionally, or alternatively, the instructions 816 may implement other methods or processes described with reference to FIGS. 5A-6C, or as described elsewhere herein. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In some embodiments, the processors 810 (e.g., a CPU, a Reduced Instruction Set Computing (RISC) processor, a Complex Instruction Set Computing (CISC) processor, a GPU, a Digital Signal Processor (DSP), an ASIC, a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory 830 may include a main memory 832, a static memory 834, and a storage unit 836, both accessible to the processors 810 such as via the bus 802. The main memory 830, the static memory 834, and storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800. The storage unit 836 can comprise a machine readable medium 838 for storing the instructions 816.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The U/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via IP geolocation, location via Wi-Fi® signal triangulation, location via detecting an NFC beacon signal that may indicate a particular location, and so forth.

The various memories (i.e., 830, 832, 834, and/or memory of the processor(s) 810) and/or storage unit 836 may store one or more sets of instructions and data structures (e.g., software) embodying or utilized by any one or more of the methodologies or functions described herein. These instructions (e.g., the instructions 816), when executed by processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), EEPROM, FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Other embodiments can comprise corresponding systems, apparatus, and computer programs recorded on one or more machine readable media, each configured to perform the operations of the methods.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object-oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of processing snapshots in a distributed file system, including:
   storing file-to-chunk mapping in file system metadata, wherein the file-to-chunk mapping maps at least a file of the distributed file system to a respective set of data chunks that are included in the file at a first time associated with a first file system generation identifier (ID), and wherein each file of the distributed file system comprises multiple data chunks;
   creating, for each data chunk included in the distributed file system, a chunk generation ID by associating each data chunk with a respective file system generation ID, wherein the respective file system generation ID for a data chunk corresponds to a time at which an earliest snapshot that includes the data chunk was obtained;
   taking, at a second time associated with a second file system generation ID, a next-generation snapshot of the distributed file system, the next-generation snapshot comprising one or more data chunks of the distributed file system;
   incrementing, for all data chunks of the one or more data chunks included in the next-generation snapshot, the respective chunk generation IDs based at least in part on taking the next-generation snapshot; and
   updating, based at least in part on taking the next-generation snapshot of the distributed file system, the file-to-chunk mapping in the file system metadata, wherein the updated file-to-chunk mapping maps the file of the distributed file system to a second set of data chunks that are included in the file at the second time associated with the second file system generation ID.

2. The method of claim 1, wherein a first snapshot associated with a first file system generation ID is set to expire, the method further comprising:
   identifying a plurality of first data chunks included in the first snapshot based at least in part on the plurality of first data chunks comprising chunk generation IDs associated with the first file system generation ID, wherein one or more first data chunks of the plurality of first data chunks are included in the updated file-to-chunk mapping in the file system metadata; and
   garbage-collecting remaining first data chunks of the plurality of first data chunks that are included in the first snapshot based at least in part on the first snapshot being set to expire and the remaining first data chunks being excluded from the file-to- chunk mapping in the file system metadata.

3. The method of claim 1, further comprising:
   rolling back the distributed file system to a previous snapshot of the distributed file system obtained before the next-generation snapshot of the distributed file system based at least in part on a chunk generation ID associated with the previous snapshot and the file system metadata comprising the file-to-chunk mapping associated with the previous snapshot.

4. The method of claim 3, further comprising:
   garbage-collecting unreachable data chunks after the rollback of the distributed file system to the previous snapshot.

5. A data management system to process snapshots of a distributed file system, comprising at least one processor configured to perform operations including:
   storing file-to-chunk mapping in file system metadata, wherein the file-to-chunk mapping maps at least a file of the distributed file system to a respective set of data chunks that are included in the file at a first time associated with a first file system generation identifier (ID), and wherein each file of the distributed file system comprises multiple data chunks;
   creating, for each data chunk included in the distributed file system, a chunk generation ID by associating each data chunk with a respective file system generation ID, wherein the respective file system generation ID for a data chunk corresponds to a time at which an earliest snapshot that includes the data chunk was obtained;
   taking, at a second time associated with a second file system generation ID, a next-generation snapshot of the distributed file system, the next-generation snapshot comprising one or more data chunks of the distributed file system;
   incrementing, for all data chunks of the one or more data chunks included in the next-generation snapshot, the respective chunk generation IDs based at least in part on taking the next-generation snapshot; and
   updating, based at least in part on taking the next-generation snapshot of the distributed file system, the file-to-chunk mapping in the file system metadata, wherein the updated file-to-chunk mapping maps the file of the distributed file system to a second set of data chunks that are included in the file at the second time associated with the second file system generation ID.

6. The data management system of claim 5, wherein a first snapshot associated with a first file system generation ID is set to expire, the operations further comprising:
   identifying a plurality of first data chunks included in the first snapshot based at least in part on the plurality of first data chunks comprising chunk generation IDs associated with the first file system generation ID, wherein one or more first data chunks of the plurality of first data chunks are included in the updated file-to-chunk mapping in the file system metadata; and
   garbage-collecting remaining first data chunks of the plurality of first data chunks that are included in the first snapshot based at least in part on the first snapshot being set to expire and the remaining first data chunks being excluded from the file-to- chunk mapping in the file system metadata.

7. The data management system of claim 5, the operations further comprising:
   rolling back the distributed file system to a previous snapshot of the distributed file system obtained before the next-generation snapshot of the distributed file system based at least in part on a chunk generation ID associated with the previous snapshot and the file system metadata comprising the file-to-chunk mapping associated with the previous snapshot.

8. The data management system of claim 7, the operations further comprising:
   garbage-collecting unreachable data chunks after the rollback of the distributed file system to the previous snapshot.

9. A tangible machine-readable medium including instructions which, when read by a machine, cause a machine to perform operations in a method of processing snapshots in a distributed file system, the operations including:

storing file-to-chunk mapping in file system metadata, wherein the file-to-chunk mapping maps at least a file of the distributed file system to a respective set of data chunks that are included in the file at a first time associated with a first file system generation identifier (ID), and wherein each file of the distributed file system comprises multiple data chunks;

creating, for each data chunk included in the distributed file system, a chunk generation ID by associating each data chunk with a respective file system generation ID, wherein the respective file system generation ID for a data chunk corresponds to a time at which an earliest snapshot that includes the data chunk was obtained;

taking, at a second time associated with a second file system generation ID, a next-generation snapshot of the distributed file system, the next-generation snapshot comprising one or more data chunks of the distributed file system;

incrementing, for all data chunks of the one or more data chunks included in the next-generation snapshot, the respective chunk generation IDs based at least in part on taking the next-generation snapshot; and updating, based at least in part on taking the next-generation snapshot of the distributed file system, the file-to-chunk mapping in the file system metadata, wherein the updated file-to-chunk mapping maps the file of the distributed file system to a second set of data chunks that are included in the file at the second time associated with the second file system generation ID.

10. The medium of claim 9, wherein a first snapshot associated with a first file system generation ID is set to expire, the operations further comprising:

identifying a plurality of first data chunks included in the first snapshot based at least in part on the plurality of first data chunks comprising chunk generation IDs associated with the first file system generation ID, wherein one or more first data chunks of the plurality of first data chunks are included in the updated file-to-chunk mapping in the file system metadata; and garbage-collecting remaining first data chunks of the plurality of first data chunks that are included in the first snapshot based at least in part on the first snapshot being set to expire and the remaining first data chunks being excluded from the file-to- chunk mapping in the file system metadata.

11. The medium of claim 9, the operations further comprising:

rolling back the distributed file system to a previous snapshot of the distributed file system obtained before the next-generation snapshot of the distributed file system based at least in part on a chunk generation ID associated with the previous snapshot and the file system metadata comprising the file-to-chunk mapping associated with the previous snapshot.

12. The medium of claim 11, the operations further comprising:

garbage-collecting unreachable data chunks after the rollback of the distributed file system to the previous snapshot.

* * * * *